United States Patent
Baughman et al.

(10) Patent No.: US 12,260,183 B2
(45) Date of Patent: Mar. 25, 2025

(54) GEOMETRIC SHAPE BASED EVENT COMPONENT PERSONALIZATION

(71) Applicant: International Business Machines Corporation, Armonk, NY (US)

(72) Inventors: Aaron K. Baughman, Cary, NC (US); Eduardo Morales, Key Biscayne, FL (US); George N Salnikoff, Millbrook, NY (US); Demetri Kambanis, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 653 days.

(21) Appl. No.: 17/476,961

(22) Filed: Sep. 16, 2021

(65) Prior Publication Data
US 2023/0083601 A1    Mar. 16, 2023

(51) Int. Cl.
*G06F 40/40*    (2020.01)
(52) U.S. Cl.
CPC .................. *G06F 40/40* (2020.01)
(58) Field of Classification Search
CPC ...... G06F 40/40; G06F 40/35; G06F 11/0706; G06F 11/0751; G06F 11/079; G06F 11/3452; G06F 2201/86; G06F 40/279; G06F 40/30; G06F 9/4887; G06F 9/542; G06F 16/285; G06F 16/90335;
(Continued)

(56) References Cited

U.S. PATENT DOCUMENTS

| 9,143,839 | B2 | 9/2015 | Reisman |
| 9,495,383 | B2 * | 11/2016 | Mishra ................... G06F 16/29 |

(Continued)

FOREIGN PATENT DOCUMENTS

| CN | 101237335 B | 3/2011 |
| EP | 1024647 B1 | 8/2007 |

(Continued)

OTHER PUBLICATIONS

Kong et al., Enhanced Selection Combining by Choosing Independently the Strongest Real Component and the Strongest Imaginary Component of all Channels, IEEE Transactions on Wireless Communications, vol. 13, No. 5, May 2014.
(Continued)

*Primary Examiner* — Abdelali Serrou
(74) *Attorney, Agent, or Firm* — Garg Law Firm, PLLC; Rakesh Garg; Michael O'Keefe

(57) ABSTRACT

Using a first trained residual neural network, an event analysis is generated from a set of event description encodings, an event description encoding in the set of event description encodings encoding a natural language description of an event, the event analysis comprising a first set of coordinates in an event space. Using a second trained residual neural network, the event analysis and a user description encoding, a personalization analysis is generated, the user description encoding a user interaction with the event, the personalization analysis comprising a component of a second set of coordinates in the event space. Using a combination of the event analysis and the personalization analysis, a first event component is activated, the first event component comprising a component of the event.

25 Claims, 10 Drawing Sheets

(58) Field of Classification Search
CPC .... G06F 16/9035; G06F 40/289; G06F 40/56; G10L 15/063; G10L 15/16; G10L 15/183; G10L 15/26; G10L 15/32; G10L 2015/0631; G10L 2015/0638; G10L 15/1822; G10L 15/20; G10L 15/22; G10L 2015/223; G10L 2015/227

See application file for complete search history.

(56) References Cited

U.S. PATENT DOCUMENTS

| | | | |
|---|---|---|---|
| 9,858,595 B2 | 1/2018 | Barnes, Jr. | |
| 10,251,561 B2 | 4/2019 | Zalev et al. | |
| 11,076,052 B2* | 7/2021 | Cartwright | G10L 21/043 |
| 11,748,057 B2* | 9/2023 | Phillips | G06F 3/167 |
| | | | 382/118 |
| 12,047,340 B2* | 7/2024 | Tee | G06F 21/31 |
| 2003/0214574 A1 | 11/2003 | Saruhashi | |
| 2008/0147430 A1 | 6/2008 | Hawthorne | |
| 2017/0132723 A1 | 5/2017 | Kim | |
| 2020/0346116 A1* | 11/2020 | Stacy | G06F 9/542 |
| 2020/0403818 A1* | 12/2020 | Daredia | G10L 17/00 |
| 2022/0293107 A1* | 9/2022 | Leaman | G06F 16/951 |

FOREIGN PATENT DOCUMENTS

| | | |
|---|---|---|
| KR | 100810647 B1 | 3/2008 |
| KR | 102046865 B1 | 11/2019 |
| WO | 2011068269 A1 | 6/2011 |

OTHER PUBLICATIONS

Hellings et al., Composite real principal component analysis of complex signals, 2015 23rd European Signal Processing Conference (EUSIPCO), Aug. 31-Sep. 4, 2015.

Zhang et al., A new real-time negative and positive sequence components detecting method based on space vector, 2001 IEEE Power Engineering Society Winter Meeting. Conference Proceedings (Cat. No. 01CH37194), Jan. 28-Feb. 1, 2001.

Deng et al., Model-driven integration of federated event services in real-time component middleware, ACM-SE 42: Proceedings of the 42nd annual Southeast regional conference, Apr. 2, 2004.

Tambe et al., Rectifying orphan components using group-failover in distributed real-time and embedded systems, CBSE '11: Proceedings of the 14th international ACM Sigsoft symposium on Component based software engineering, Jun. 20, 2011.

Fredriksson et al., Optimizing resource usage in component-based real-time systems, CBSE'05: Proceedings of the 8th international conference on Component-Based Software Engineering, May 14, 2005.

\* cited by examiner

GEOMETRIC SHAPE BASED EVENT COMPONENT PERSONALIZATION

BACKGROUND

The present invention relates generally to a method, system, and computer program product for event component personalization. More particularly, the present invention relates to a method, system, and computer program product for geometric shape based event component personalization.

An event is a planned public or social occasion, at which participants gather to hear a presentation, meet other participants, take part in an interactive experience either alone or with other participants, and the like. An event component is an interaction between the event organizer and an attendee, such as a presentation, keynote speech, breakout session, workshops, sponsor or vendor booth, a reception or meal, networking opportunity, and the like. Some events take place entirely in the physical world—i.e., attendees gather at one or more physical locations (e.g. a hotel, conference center, stadium, or park) and attend one or more event components in person. Some events take place entirely virtually—i.e., attendees are physically separated from the event but interact with one or more event components via data transmission (e.g. using an online conferencing platform or watching on television)—and are called virtual events. A hybrid event includes both physical and virtual event components. For example, a hybrid event component might include some attendees watching a presentation and asking the presenter questions physically, while others watch via an online platform and ask questions via telephone or a different online platform. As another example, an application executing on a physical attendee's mobile device can complement an in-person experience, providing schedules, background information and contact details for other attendees, and an online communication opportunity. An offline event is a virtual event that is consumed prior or after the event happens, such as watching a recording of a presentation or tournament after the event has finished.

The illustrative embodiments recognize that an event attendee, or user, will have an improved experience if event components are personalized to a user's needs or preferences. Some users may not be able to travel to an in-person event and require a fully virtual event. Some in-person attendees attend in-person events specifically to avoid device-mediated interactions with others, while others find such device-mediated interactions useful or enjoyable. Some attendees cannot walk long distances, so might attend some sessions physically and some virtually, depending on each session's location. However, events today are typically designed as either physical or virtual. Hybrid event components are typically designed as add-ons to a physical event, such as the opportunity to participate in some physical sessions virtually, while other event components such as meals or the opportunity to interact with other attendees outside of formal sessions remain physical-only. In addition, the same hybrid option is typically offered to all users, regardless of an individual's particular status or preferences, and without the ability to recommend a particular type of event component to a particular user or otherwise personalize the event experience. Thus, the illustrative embodiments recognize that there is an unmet need to automatically personalize individual event components to a user's needs or preferences.

SUMMARY

The illustrative embodiments provide a method, system, and computer program product. An embodiment includes a method that generates, using a first trained residual neural network, an event analysis from a set of event description encodings, an event description encoding in the set of event description encodings encoding a natural language description of an event, the event analysis comprising a first set of coordinates in an event space. An embodiment generates using a second trained residual neural network, the event analysis and a user description encoding, a personalization analysis, the user description encoding a user interaction with the event, the personalization analysis comprising a component of a second set of coordinates in the event space. An embodiment activates, using a combination of the event analysis and the personalization analysis, a first event component, the first event component comprising a component of the event. Thus the embodiment provides a method of geometric shape based event component personalization.

Another embodiment further includes generating, using a trained natural language processing model, the event description encoding. Thus, the embodiment generates an event description encoding used in geometric shape based event component personalization.

In another embodiment, the first set of coordinates in the event space comprises a first point on a geometric shape. Thus, the embodiment provides further detail of geometric shape based event component personalization.

In another embodiment, the combination of the event analysis and the personalization analysis comprises a point on the geometric shape closest to a product of the first set of coordinates and the component of the second set of coordinates. Thus, the embodiment provides further detail of geometric shape based event component personalization.

In another embodiment, the event space is two-dimensional. Thus, the embodiment provides further detail of the event space used in geometric shape based event component personalization.

In another embodiment, a first axis in the event space represents a degree to which the event takes place physically and a second axis in the event space represents a degree to which the event takes place virtually, the first axis perpendicular to the second axis. Thus, the embodiment provides further detail of the event space used in geometric shape based event component personalization.

In another embodiment, the first set of coordinates in the event space comprises a first point on a unit circle. Thus, the embodiment provides further detail of the event space used in geometric shape based event component personalization.

In another embodiment, the event space is three-dimensional. Thus, the embodiment provides further detail of the event space used in geometric shape based event component personalization.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

An embodiment includes a data processing environment. The data processing environment includes one or more processors, one or more computer-readable memories, and one or more computer-readable storage devices, and program instructions stored on at least one of the one or more storage devices for execution by at least one of the one or more processors via at least one of the one or more memories.

An embodiment includes a natural language processing system. The natural language processing system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

Figure 1:
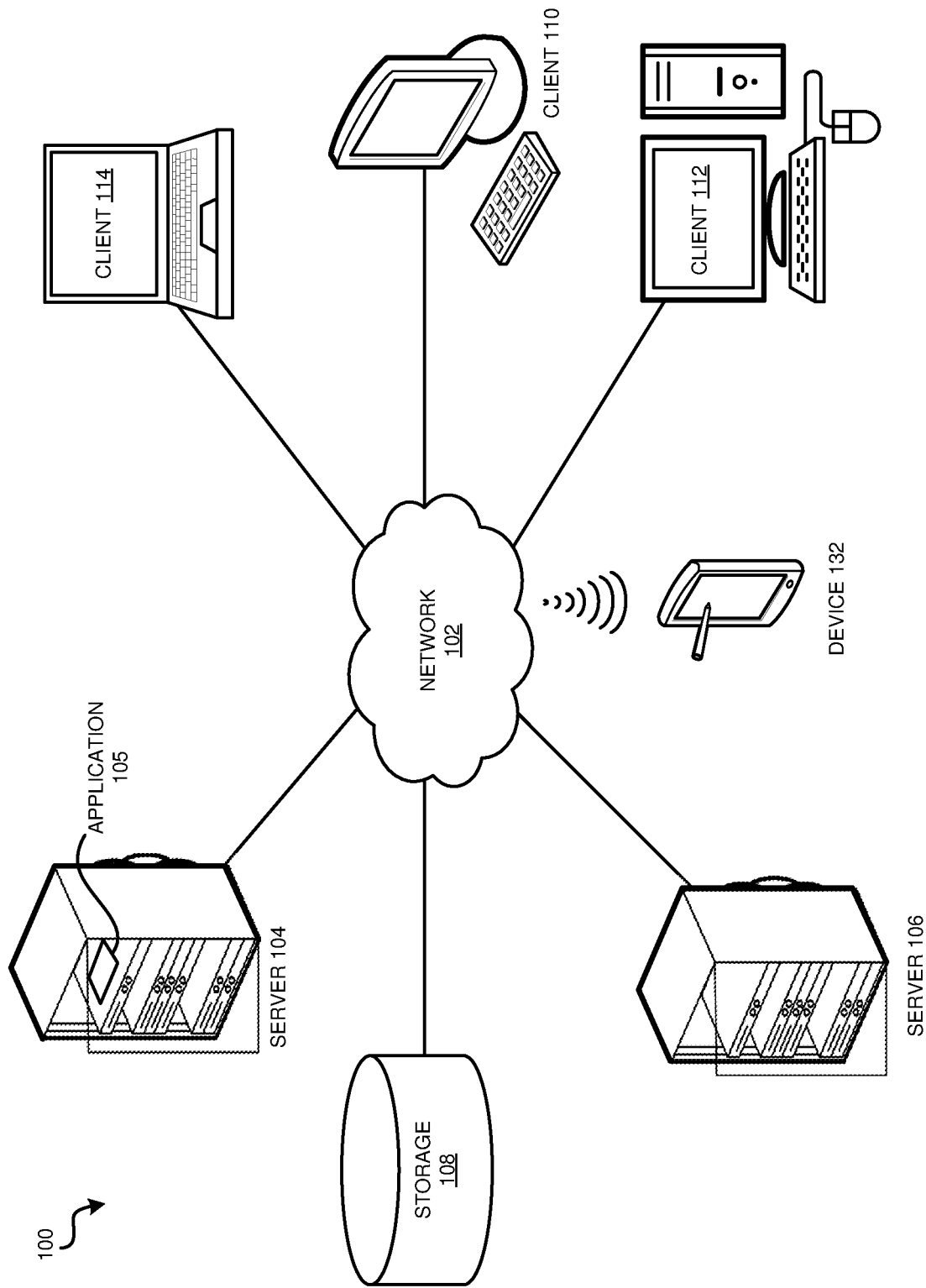
FIG. 1 depicts a block diagram of a network of data processing systems in which illustrative embodiments may be implemented.

DETAILED DESCRIPTION the illustrative embodiments recognize that there is an unmet need to automatically personalize individual event components to a user's needs or preferences. The illustrative embodiments recognize that the presently available tools or solutions do not address these needs or provide adequate solutions for these needs. The illustrative embodiments used to describe the invention generally address and solve the above-described problems and other problems related to geometric shape based event component personalization.

An embodiment can be implemented as a software application. The application implementing an embodiment can be configured as a modification of an existing event management system, as a separate application that operates in conjunction with an existing event management system, a standalone application, or some combination thereof.

Particularly, some illustrative embodiments provide a method that uses a first trained residual neural network to generate an event analysis from a set of event description encodings encoding natural language event descriptions, uses a second trained residual neural network to generate a personalization analysis from the event analysis and a set of user description encodings, and uses a combination of the event analysis and the personalization analysis to activate a first event component.

An embodiment defines an event space. Each dimension of the event space represents a different characteristic of an event component. Thus, a set of coordinates within the event space corresponds to how much of each characteristic an event component has.

In particular, in one example two-dimensional event space, one axis (e.g. the x-axis) represents a degree to which an event component is physical, and another axis (e.g. the y-axis) represents a degree to which an event component is virtual. The two axes are perpendicular to each other. Coordinates along both axes can be both positive and negative, and the two axes meet at the (0,0) set of coordinates. Thus, a set of coordinates in the bottom right quadrant represents an event component that is purely physical, a set of coordinates in the top left quadrant represents an event component that is purely virtual, a set of coordinates in the top right quadrant represents an event component that is partly physical and partly virtual (thus, hybrid), and a set of coordinates in the bottom left quadrant represents an event component that is offline. A set of coordinates in the two-dimensional event space can also be treated as a complex number, with a real component equal to an x coordinate and an imaginary component equal to a y coordinate. Within the two-dimensional event space, a point on a unit circle (a circle with a radius of one) is described using the expression $e^{ix}=\cos(x)+i\sin(x)$, where e denotes the base of the natural logarithm (approximately 2.71828), i is the imaginary unit (the square root of −1), and cos and sin are the trigonometric functions cosine and sine respectively.

In one example three-dimensional event space, one axis (e.g. the z-axis) represents a degree to which an event component is physical event, a second axis perpendicular to the first axis (e.g. the y-axis) represents a degree to which an event component is virtual event, and a third axis (e.g. the x-axis), perpendicular to the other two axes, represents a degree of interaction associated with a user of the event component. Within the three-dimensional event space, a point on a unit sphere (a sphere with a radius of one) is described using the expressions depicted as equal to $\Psi$ in FIG. 5.

Other event spaces, of two or more dimensions, in which two or more axes represent different aspects of an event component, are also possible and contemplated within the scope of the illustrative embodiments. Geometric shapes other than a circle or a sphere within an event space are also possible and contemplated within the scope of the illustrative embodiments. A geometric shape is the geometric information which remains when location, scale, orientation and reflection are removed from the description of a geometric object, so that moving a shape, enlarging or shrinking it, rotating it, or reflecting it results in the same geometric shape as the original.

An embodiment receives, as input, one or more natural language descriptions of an event or one or more components of the event. Some non-limiting examples of natural language descriptions of an event or its components include a text document describing a conference, text describing a particular feature or component of a conference such as a networking opportunity or an opportunity to describe a start-up business to potential investors, and a text response to the feature or component such as a posting on a social media platform. The natural language descriptions need not be received in text form; if not, an embodiment converts them to text form using a presently available audio to text, video to text, or another text conversion technique.

An embodiment converts a natural language description of an event or event component to a set of corresponding numerical representations, also called event encodings or embeddings. One embodiment uses a trained natural language processing model to generate event encodings from natural language text, using a presently available technique. For example, one presently known technique includes using one or more trained natural language processing models to perform extractive summarization on one or more documents to generate a textual summary of a document, identify key words within the most important sentences of a textual summary, and convert one or more key words to a corresponding numerical representation using word2vec or another presently known word-to-vector conversion technique.

An embodiment uses a trained neural network to generate an event analysis from the set of event encodings. An event analysis is a set of coordinates in an event space. In other words, the neural network categorizes an event or event component by assigning a set of coordinates in the event space. In one embodiment, the set of coordinates is a point on a geometric shape. In one embodiment using a two-dimensional event space, the geometric shape is the unit circle and the set of coordinates is denoted by $e^{ix}$ as described herein. In another embodiment using a three-dimensional event space, the geometric shape is the unit sphere and the set of coordinates is denoted by $\Psi$ as described herein. In one embodiment, the neural network is a residual neural network. A residual neural network is a presently known neural network configuration that includes one or more weighting layers, arranged in series, along with one or more skip connections that skip one or more layers. Skip connections help avoid the problem of weights within the layers not changing sufficiently during neural network training and thus preventing training from completion. Non-linear functions (e.g., ReLu, a rectified linear unit defined as $f(x)=\max(0,x)$ are present between some of the layers in series. In some configurations, the skip connections are also weighted. Other embodiments using other types of neural network are also possible and contemplated within the scope of the illustrative embodiments. The neural network is trained to generate an event analysis using a set of training data and a presently known neural network training technique.

An embodiment converts user data to a corresponding numerical representation, called a user description encoding. User data is data of a user's interaction with an event. Some non-limiting examples of user data are a user's selections of particular conference sessions or topics to attend, a user's mode of interaction with a particular event component (e.g. in-person, online, or a hybrid), a user's engagement with a particular event component (e.g. how long the user stays at a component or type of component, how often the user uses the component, other activities the user is performing while attending the component), a user's feedback regarding a session, and the like. If a portion of the user data is in the form of natural language text (e.g. a topic tag or a textual description of an event component), the embodiment uses a trained natural language processing model to generate a corresponding encoding or set of encodings from natural language text in a manner described herein. If a portion of the user data is in the form of event features a user utilized, the embodiment encodes the features into a numerical representation using a presently known feature encoding technique, such as one hot encoding. One hot encoding is a binary numerical representation in which a selected feature is represented by a one and all other possible features are represented by zeroes. One embodiment generates a numerical representation for each element of a data structure storing user data that is not already in numerical form, then treats each numerical representation as a dimension of a resulting multi-dimensional representation. Another embodiment also normalizes each numerical representation to a common scale, for example zero to one.

An embodiment uses a second trained neural network to generate a personalization analysis from the user description encoding and the event. The personalization analysis is a coordinate along one axis of an event space. In other words, the second neural network encodes a personalization criteria, which influences where an event component is positioned in a geometric shape, such as a circle's, circumference. In one embodiment using a two-dimensional event space, the personalization analysis comprises a real component of a complex number and is denoted by $e^p=\cos(p)$. In another embodiment using a three-dimensional event space, the personalization analysis comprises a value on the z-axis representing a real value. In one embodiment, the second neural network is a residual neural network, but need not have the same configuration as the first neural network. Other embodiments using other types of neural network are also possible and contemplated within the scope of the illustrative embodiments. The second neural network is trained to generate a personalization analysis using a set of training data and a presently known neural network training technique.

If the event space includes more than two dimensions, an embodiment generates an encoding corresponding to an additional dimension of the event space and applies the additional encoding, the user description encoding, and the event analysis to a third neural network trained to generate an additional analysis. Thus, if the event space includes a third dimension representing a degree of interaction associated with a user of the event, an embodiment converts user interaction data to a corresponding user interaction encoding in a manner described herein, Some non-limiting examples of user interaction data are how active or passive a user is during an event component (e.g. asking questions vs. only listening) and whether a user attends interactive components such as networking sessions, or only passive components (e.g. a pre-recorded lecture or a set of posters). The embodiment applies the user interaction encoding and the event analysis to a third neural network trained to generate an interaction analysis. The interaction analysis comprises a coordinate along the interaction axis of the event space. In an embodiment using a three-dimensional event space, one axis (e.g. the z-axis) represents a degree to which an event component is a physical event, a second axis perpendicular to the first axis (e.g. the y-axis) represents a degree to which an event component is a virtual event, and the interaction analysis comprises a value on the x-axis representing an interaction or social value.

An embodiment combines the event analysis, the personalization analysis, and any optional additional analysis together, and uses the combination to activate one or more event components. To combine the analyses, one embodiment multiplies them together. In particular, if the event space is two-dimensional, the event analysis is denoted by $e^{ix}$, and the personalization analysis is denoted by $e^p$, the embodiment computes $e^{ix} e^p = \cos(p)\cos(x) + i\sin(x)\cos(p)$. To combine the analyses, another embodiment adds them together. In particular, if the event space is three-dimensional, the embodiment adds a personalization term to the expressions depicted as equal to $\Psi$ in FIG. 5.

An embodiment determines a closest point on a geometric shape to the product of the analyses, and uses that closest point to determine which event components should be activated for a user. Thus, if the event space is two-dimensional, one axis represents a degree to which an event component is a physical event, and another axis represents a degree to which an event component is a virtual event, the position of the closest point on a unit circle determines whether to activate a physical, virtual, hybrid, or offline event component. If the event space is three-dimensional with a third axis representing a degree of interaction associated with a user of the event, the position of the closest point on a unit sphere determines whether to activate an event component with some amount of interactivity. The embodiment then activates the selected components for that user, offering them to a user to personalize the user's experience with the event. Some non-limiting examples of event components are a summary of a session the user indicated an interest in but did not attend due to a conflict with another session, an interaction opportunity (either physical, virtual, or a hybrid) such as a networking session, a tour (physical or virtual) of a site near an event site, a gamification opportunity related to the event, and a suggestion of a session on a topic the user might be interested in. An embodiment uses a device on which the embodiment is executing to present a virtual event component or an online portion of a hybrid event component, and uses the device to offer a recommendation for and access to an activated physical event component.

The manner of geometric shape based event component personalization described herein is unavailable in the presently available methods in the technological field of endeavor pertaining to automated event management. A method of an embodiment described herein, when implemented to execute on a device or data processing system, comprises substantial advancement of the functionality of that device or data processing system in using a first trained residual neural network to generate an event analysis from a set of event description encodings encoding natural language event descriptions, using a second trained residual neural network to generate a personalization analysis from the event analysis and a set of user description encodings, and using a combination of the event analysis and the personalization analysis to activate a first event component.

The illustrative embodiments are described with respect to certain types of events, event components, event data, user data, event spaces, geometrical shapes, event analyses, personalization analyses, coordinates, neural networks, adjustments, activations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
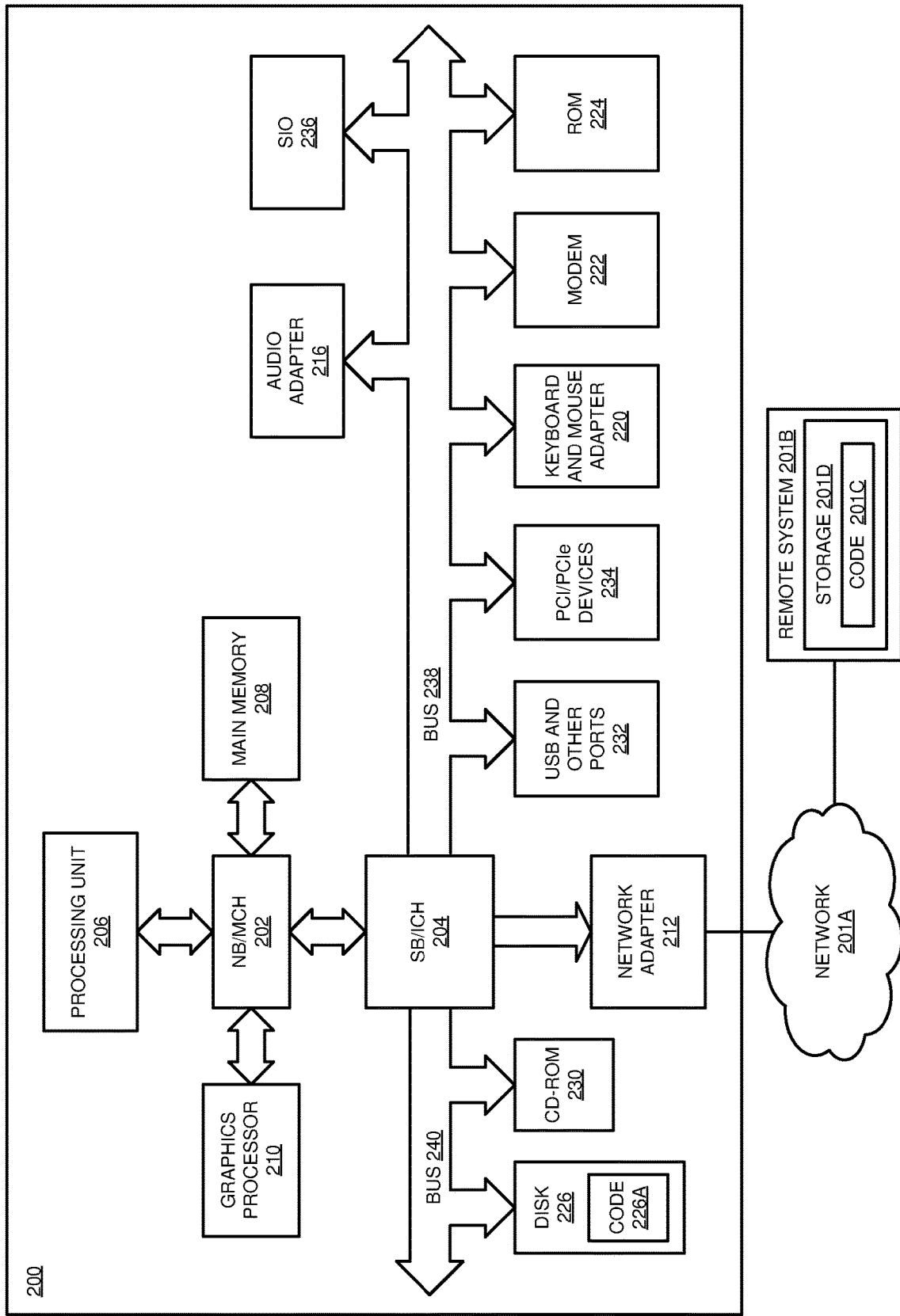
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
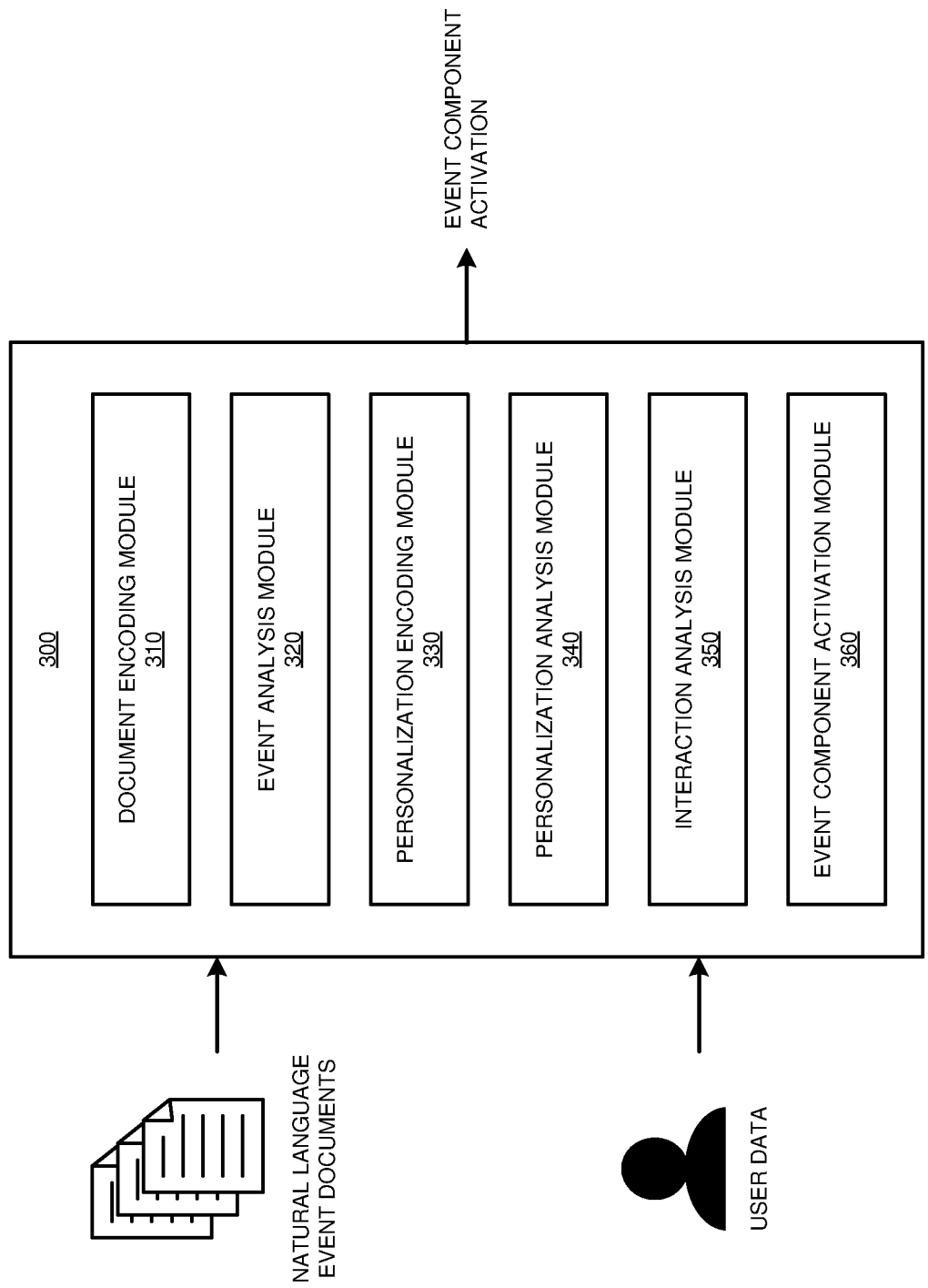
FIG. 3 depicts a block diagram of an example configuration for geometric shape based event component personalization in accordance with an illustrative embodiment.

With reference to FIG. 3, this figure depicts a block diagram of an example configuration for geometric shape based event component personalization in accordance with an illustrative embodiment. Application 300 is an example of application 105 in FIG. 1 and executes in any of servers 104 and 106, clients 110, 112, and 114, and device 132 in FIG. 1.

Document encoding module 310 converts a natural language description of an event or event component to a set of corresponding numerical representations, also called event encodings or embeddings. One implementation of module 310 uses a trained natural language processing model to generate event encodings from natural language text, using a presently available technique.

Event analysis module 320 uses a trained neural network to generate an event analysis from the set of event encodings. An event analysis is a set of coordinates in an event space. In other words, the neural network categorizes an event or event component by assigning a set of coordinates in the event space. In one implementation of module 320, the set of coordinates is a point on a geometric shape. In one implementation of module 320 using a two-dimensional event space, the geometric shape is the unit circle and the set of coordinates is denoted by $e^{ix}$. In another implementation of module 320 using a three-dimensional event space, the geometric shape is the unit sphere and the set of coordinates is denoted by W. In one implementation of module 320, the neural network is a residual neural network. The neural network is trained to generate an event analysis using a set of training data and a presently known neural network training technique.

Personalization encoding module 330 converts user data to a corresponding numerical representation, called a user description encoding. If a portion of the user data is in the form of natural language text (e.g. a topic tag or a textual description of an event component), module 330 uses a trained natural language processing model to generate a corresponding encoding or set of encodings from natural language text in a manner described herein. If a portion of the user data is in the form of event features a user utilized, module 330 encodes the features into a numerical representation using a presently known feature encoding technique, such as one hot encoding. One implementation of module 330 generates a numerical representation for each element of a data structure storing user data that is not already in numerical form, then treats each numerical representation as a dimension of a resulting multi-dimensional representation. Another implementation of module 330 also normalizes each numerical representation to a common scale, for example zero to one.

Personalization analysis module 340 uses a second trained neural network to generate a personalization analysis from the user description encoding and the event. The personalization analysis is a coordinate along one axis of an event space. In other words, the second neural network encodes a personalization criteria, which influences where an event component is positioned in a geometric shape, such as a circle's, circumference. In one implementation of module 340 using a two-dimensional event space, the personalization analysis comprises a real component of a complex number and is denoted by $e^p = \cos(p)$. In another implementation of module 340 using a three-dimensional event space, the personalization analysis comprises a value on the z-axis representing a real value. In one implementation of module 340, the second neural network is a residual neural network, but need not have the same configuration as the first neural network. The second neural network is trained to generate a personalization analysis using a set of training data and a presently known neural network training technique.

If the event space includes more than two dimensions, personalization analysis module 330 generates an encoding corresponding to an additional dimension of the event space and applies the additional encoding, the user description encoding, and the event analysis to a third neural network trained to generate an additional analysis. Thus, if the event space includes a third dimension representing a degree of interaction associated with a user of the event, module 330 converts user interaction data to a corresponding user interaction encoding in a manner described herein. Interaction analysis module 350 uses a third trained neural network to generate an interaction analysis from the user interaction encoding and the event analysis. The interaction analysis is a coordinate along the interaction axis of the event space. In an implementation of application 300 using a three-dimensional event space, one axis (e.g. the z-axis) represents a degree to which an event component is a physical event, a second axis perpendicular to the first axis (e.g. the y-axis) represents a degree to which an event component is a virtual event, and the interaction analysis comprises a value on the x-axis representing an interaction or social value.

Event component activation module 360 combines the event analysis, the personalization analysis, and any optional additional analysis together, and uses the combination to activate one or more event components. To combine the analyses, one implementation of module 360 multiplies them together. In particular, if the event space is two-dimensional, the event analysis is denoted by $e^{ix}$, and the personalization analysis is denoted by $e^p$, module 360 computes $e^{ix} e^p = \cos(p) \cos(x) + i \sin(x) \cos(p)$. To combine the analyses, another implementation of module 360 adds them together. In particular, if the event space is three-dimensional, module 360 adds a personalization term to the expressions depicted as equal to Ψ in FIG. 5.

Module 360 determines a closest point on a geometric shape to the product of the analyses, and uses that closest point to determine which event components should be activated for a user. Thus, if the event space is two-dimensional, one axis represents a degree to which an event component is a physical event, and another axis represents a degree to which an event component is a virtual event, the position of the closest point on a unit circle determines whether to activate a physical, virtual, hybrid, or offline event component. If the event space is three-dimensional with a third axis representing a degree of interaction associated with a user of the event, the position of the closest point on a unit sphere determines whether to activate an event component with some amount of interactivity. Module 360 then activates the selected components for that user, offering them to a user to personalize the user's experience with the event.

Figure 4:
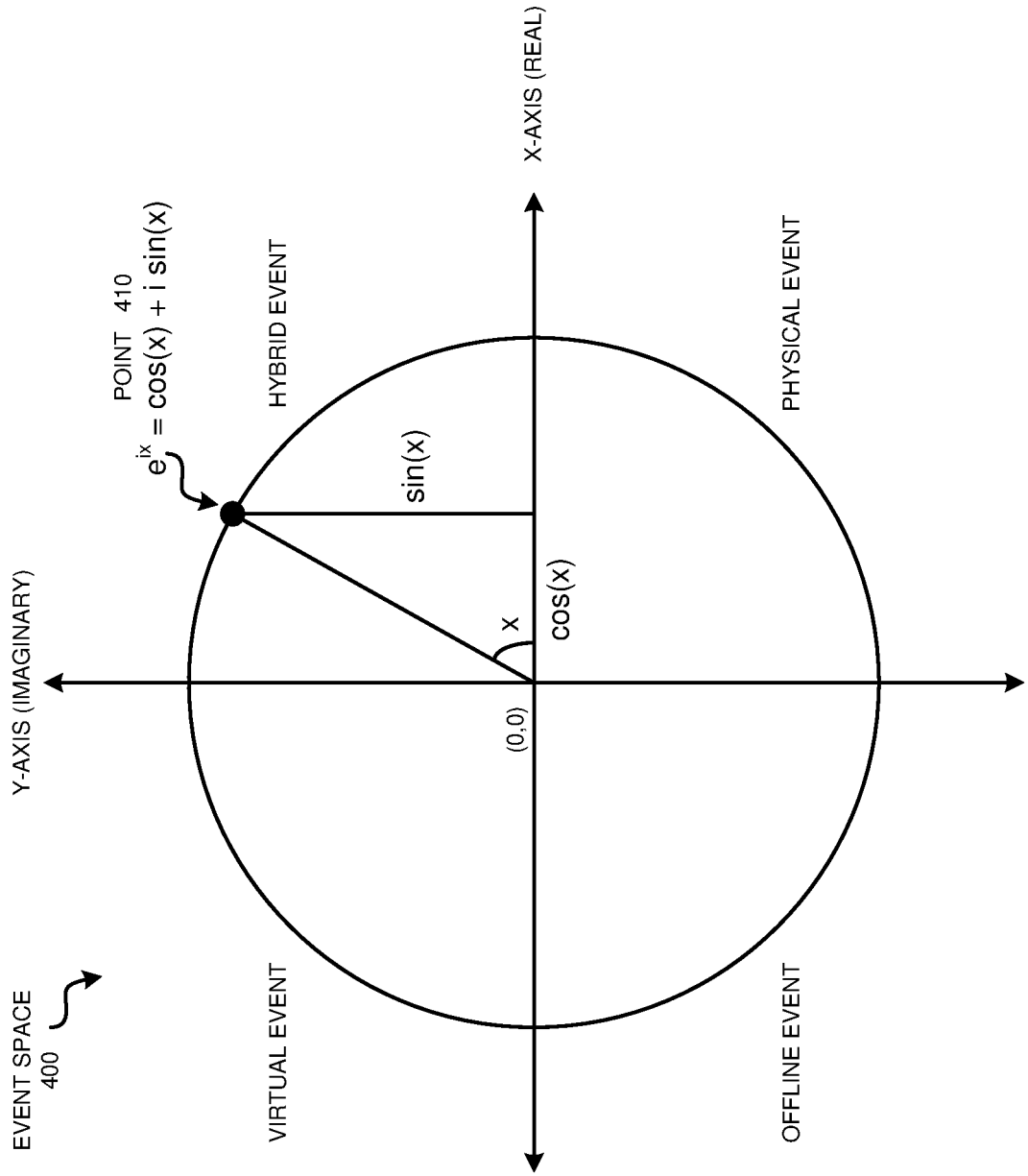
FIG. 4 depicts an example of an event space for use in geometric shape based event component personalization in accordance with an illustrative embodiment.

With reference to FIG. 4, this figure depicts an example of an event space for use in geometric shape based event component personalization in accordance with an illustrative embodiment. Event space 400 can be used by application 300 in FIG. 3.

Event space 400 is an example two-dimensional event space. The x-axis represents a degree to which an event component is physical, and the y-axis represents a degree to which an event component is virtual. The two axes are perpendicular to each other. Coordinates along both axes can be both positive and negative, and the two axes meet at the (0,0) set of coordinates. Thus, a set of coordinates in the bottom right quadrant represents an event component that is purely physical, a set of coordinates in the top left quadrant represents an event component that is purely virtual, a set of coordinates in the top right quadrant represents an event component that is partly physical and partly virtual (thus, hybrid), and a set of coordinates in the bottom left quadrant represents an event component that is offline. A set of coordinates in the two-dimensional event space can also be treated as a complex number, with a real component equal to an x coordinate and an imaginary component equal to a y coordinate. Within the two-dimensional event space, point 410 a point on a unit circle (a circle with a radius of one) and is described using the expression $e^{ix}=\cos(x)+i\sin(x)$, where e denotes the base of the natural logarithm (approximately 2.71828), i is the imaginary unit (the square root of −1), and cos and sin are the trigonometric functions cosine and sine respectively.

Figure 5:
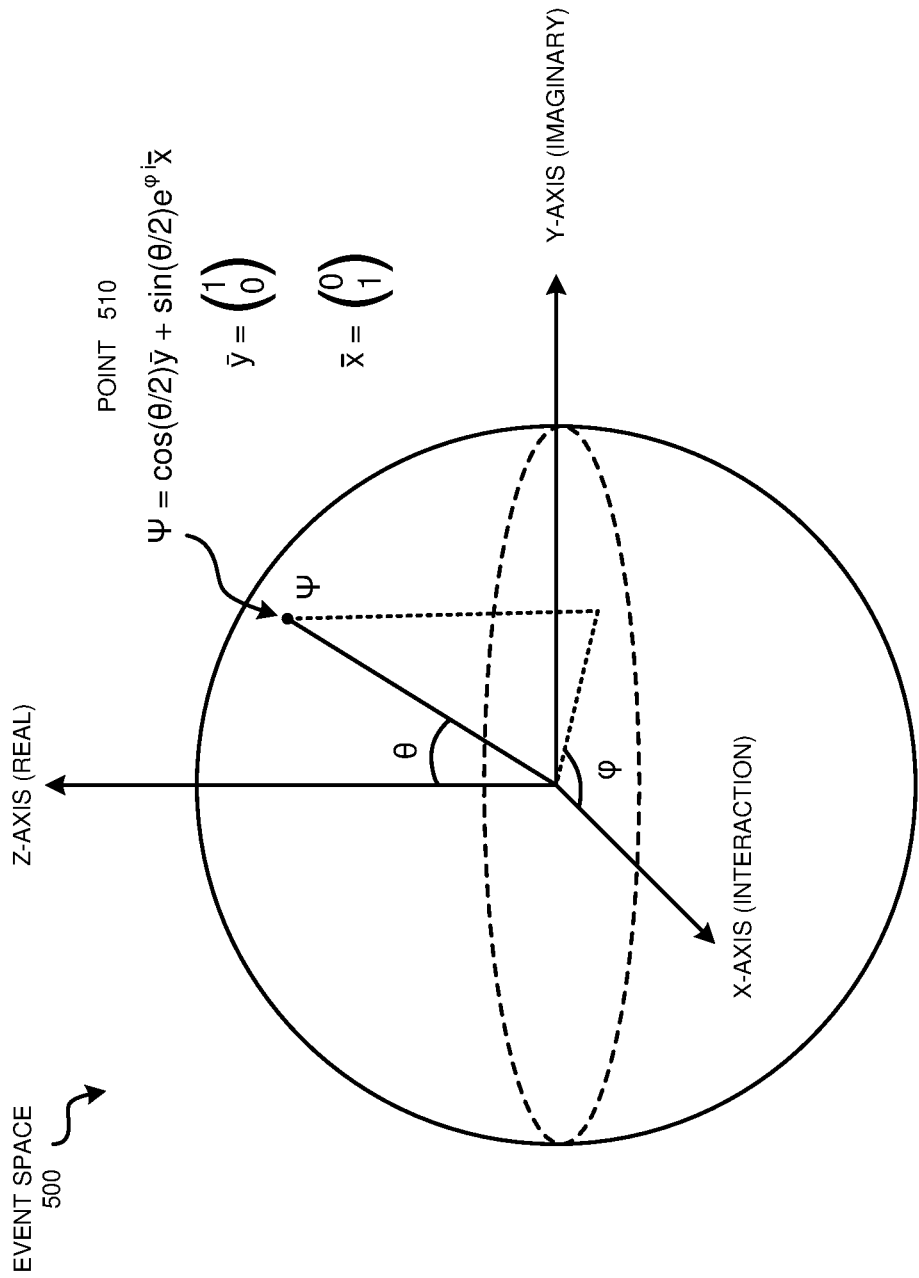
FIG. 5 depicts another example of an event space for use in geometric shape based event component personalization in accordance with an illustrative embodiment.

With reference to FIG. 5, this figure depicts another example of an event space for use in geometric shape based event component personalization in accordance with an illustrative embodiment. Event space 500 can be used by application 300 in FIG. 3.

Event space 500 is an example three-dimensional event space. The z-axis represents a degree to which an event component is physical, the y-axis, perpendicular to the z-axis represents a degree to which an event component is virtual event, and the x-axis, perpendicular to the other two axes, represents a degree of interaction associated with a user of the event component. Within the three-dimensional event space, point 510 is a point on a unit sphere (a sphere with a radius of one), and is described using the expressions depicted as equal to Ψ in FIG. 5.

Figure 6:
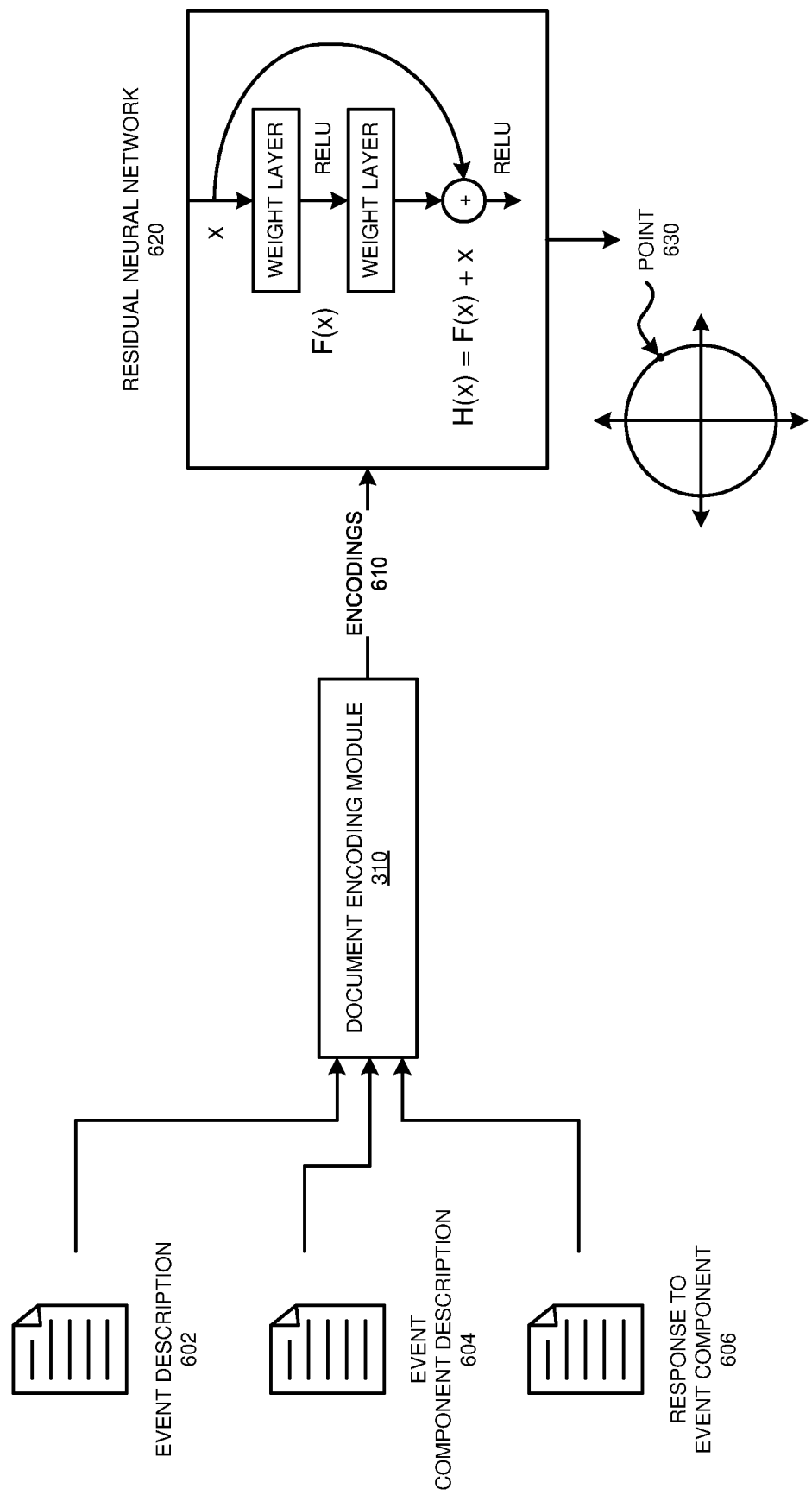
FIG. 6 depicts an example of geometric shape based event component personalization in accordance with an illustrative embodiment.

With reference to FIG. 6, this figure depicts an example of geometric shape based event component personalization in accordance with an illustrative embodiment. The example can be executed using application 300 in FIG. 3. Document encoding module 310 is the same as document encoding module 310 in FIG. 3.

Event description 602 is a natural language description of an event. Event component description 604 is a natural language description of an event component such as a networking opportunity or an opportunity to describe a start-up business to potential investors. Response to event component 606 is a text response to the feature or component such as a posting on a social media platform. Document encoding module 310 converts descriptions 602, 604, and 606 to encodings 610. Residual neural network 620, a trained neural network, generates point 630, a set of coordinates on the unit circle of an event space. Note that residual neural network 620 is depicted schematically, and is only one example of a possible residual neural network configuration usable to generate point 630 from encodings 610.

Figure 7:
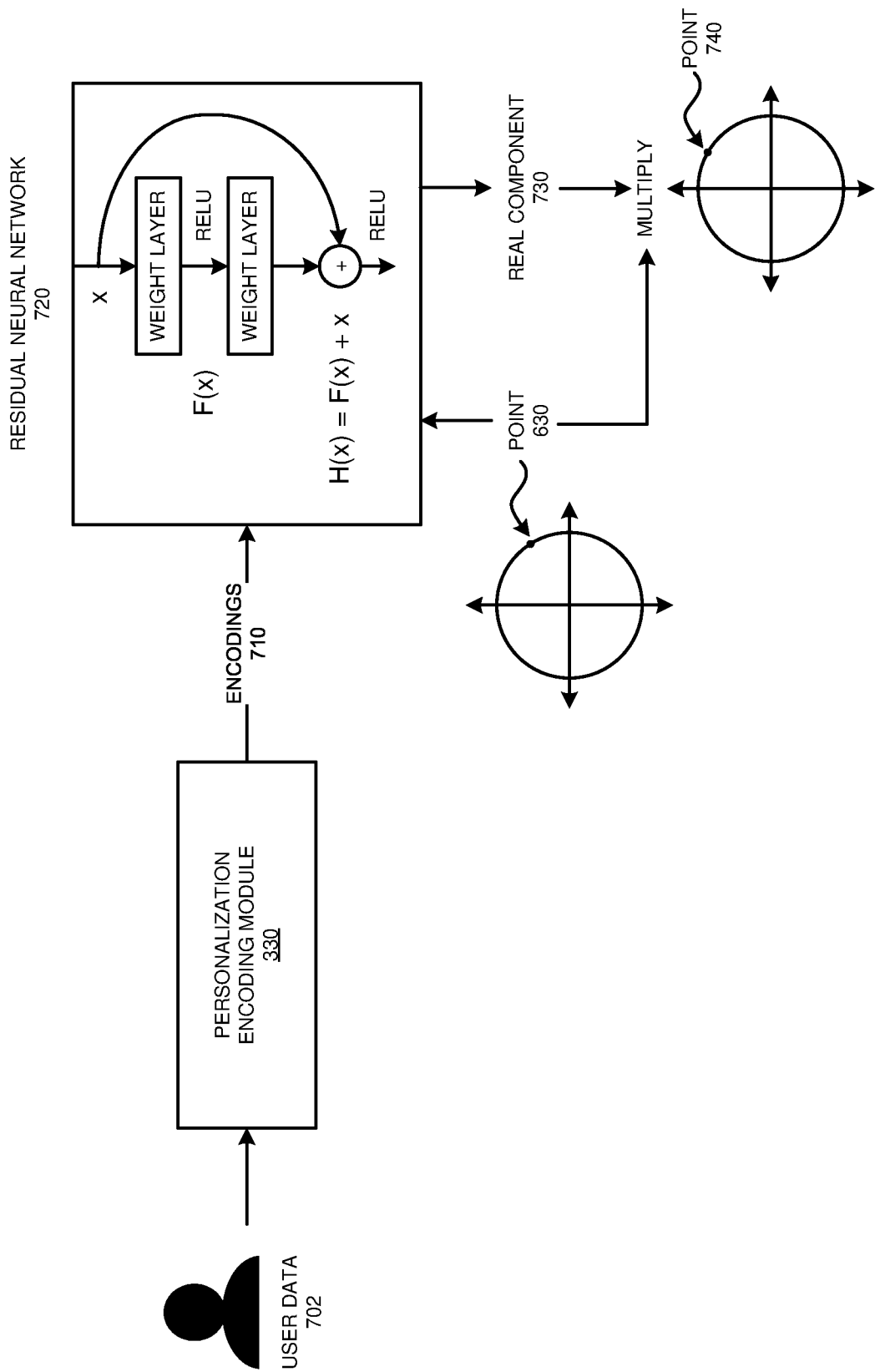
FIG. 7 depicts a continued example of geometric shape based event component personalization in accordance with an illustrative embodiment.

With reference to FIG. 7, this figure depicts a continued example of geometric shape based event component personalization in accordance with an illustrative embodiment. The example can be executed using application 300 in FIG. 3. Personalization encoding module 330 is the same as personalization encoding module 330 in FIG. 3. Point 630 is the same as point 630 in FIG. 6.

Personalization encoding module 330 converts user data 702 to encodings 710. User data 702 includes one or more of a user's selections of particular conference sessions or topics to attend, a user's mode of interaction with a particular event component (e.g. in-person, online, or a hybrid), a user's engagement with a particular event component (e.g. how long the user stays at a component or type of component, how often the user uses the component, other activities the user is performing while attending the component), a user's feedback regarding a session, and the like. Residual neural network 720, a trained neural network, generates real component 730, a real component of a complex number. Note that residual neural network 720 is depicted schematically, and is only one example of a possible residual neural network configuration usable to generate real component 730 from encodings 710. Point 630 and real component 730 are multiplied together, and a closest point on the unit circle to the product is determined—point 740. Point 740 is usable to determine which event components should be activated for the user associated with user data 702.

Figure 8:
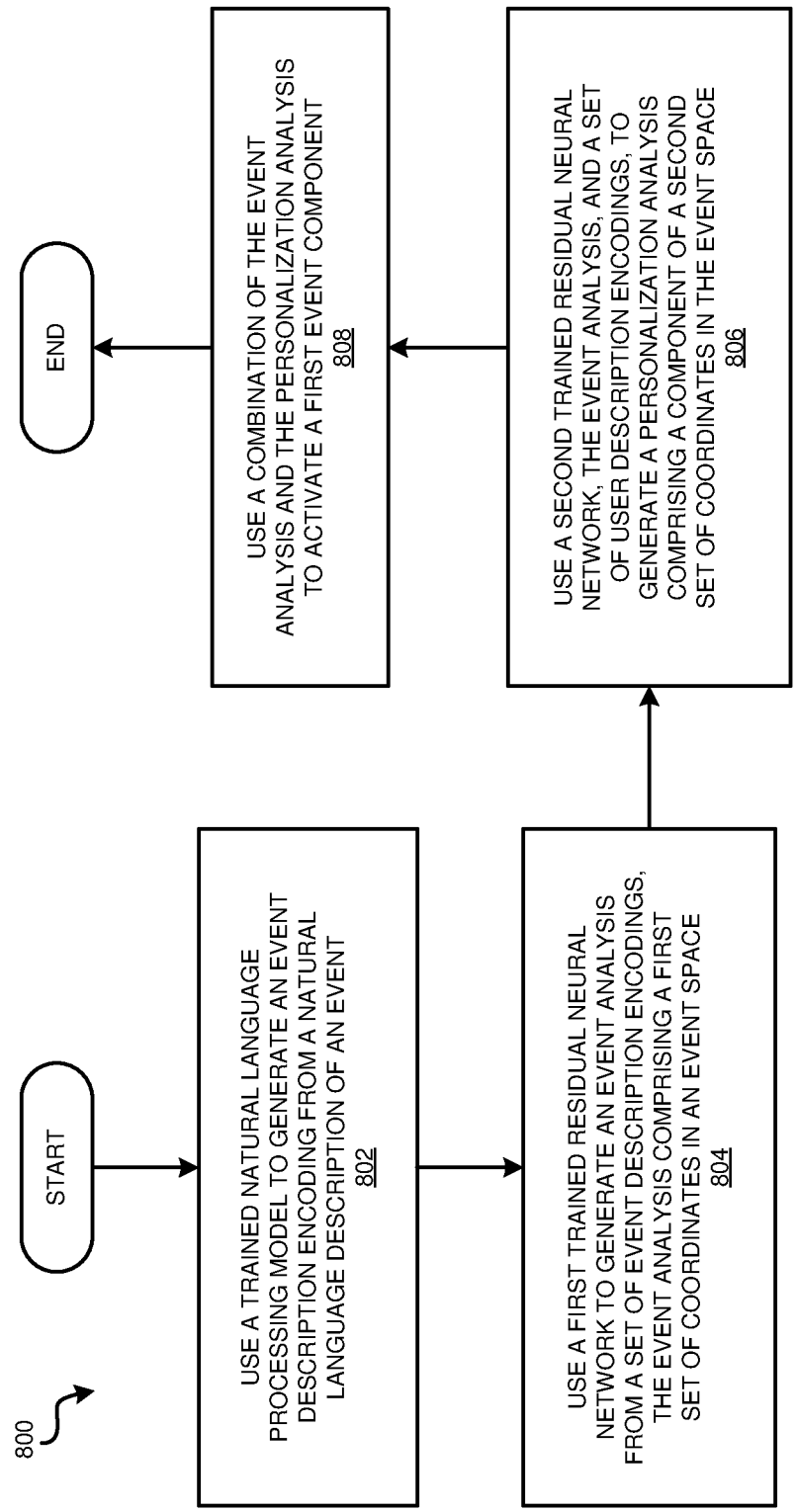
FIG. 8 depicts a flowchart of an example process for geometric shape based event component personalization in accordance with an illustrative embodiment.

With reference to FIG. 8, this figure depicts a flowchart of an example process for geometric shape based event component personalization in accordance with an illustrative embodiment. Process 800 can be implemented in application 300 in FIG. 3.

In block 802, the application uses a trained natural language processing model to generate an event description encoding from a natural language description of an event. In block 804, the application uses a first trained residual neural network to generate an event analysis from a set of event description encodings, the event analysis comprising a first set of coordinates in an event space. In block 806, the application uses a second trained residual neural network, the event analysis, and a set of user description encodings to generate a personalization analysis comprising a component of a second set of coordinates in the event space. In block 808, the application uses a combination of the event analysis and the personalization analysis to activate a first event component. Then the application ends.

Figure 9:
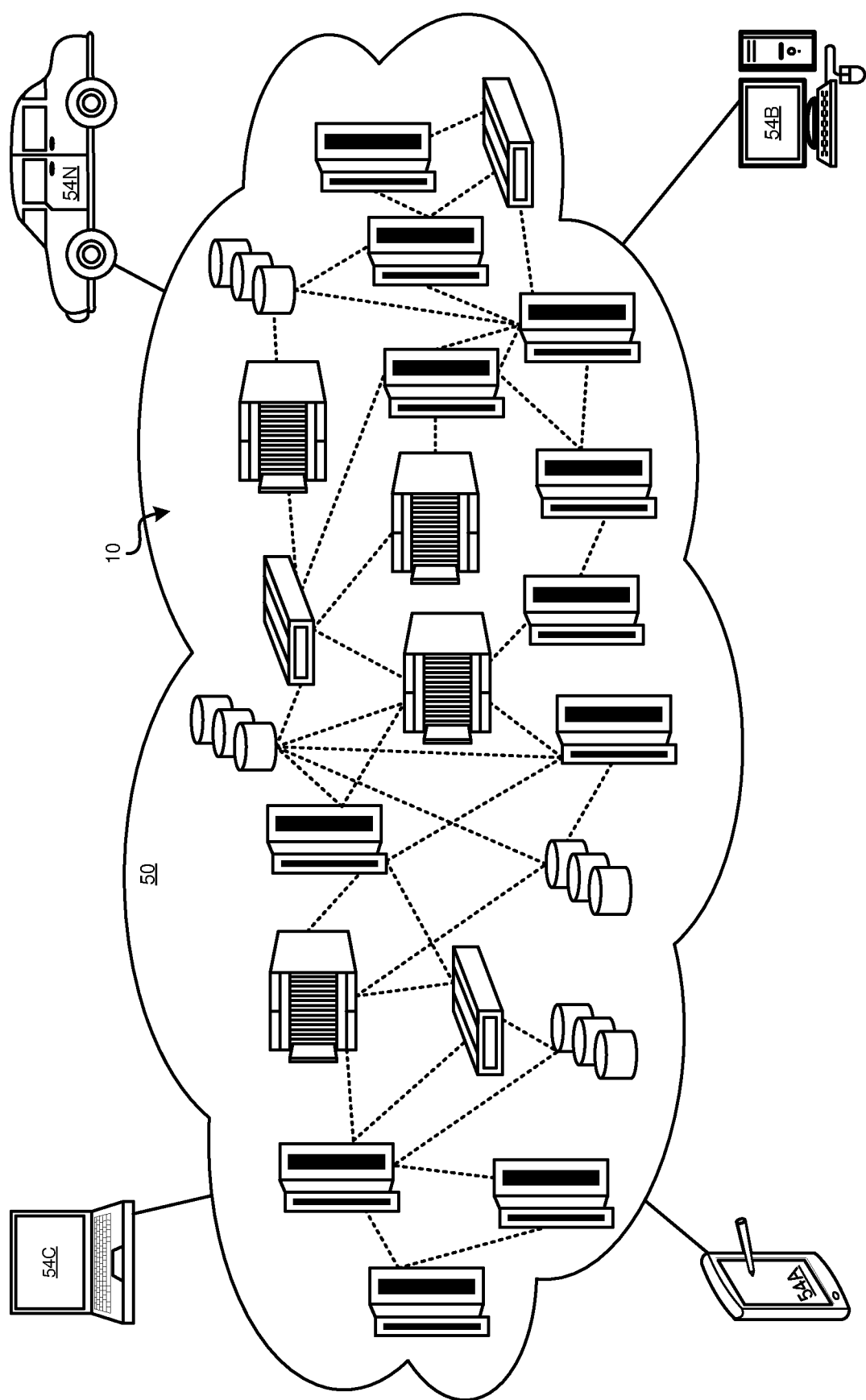
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
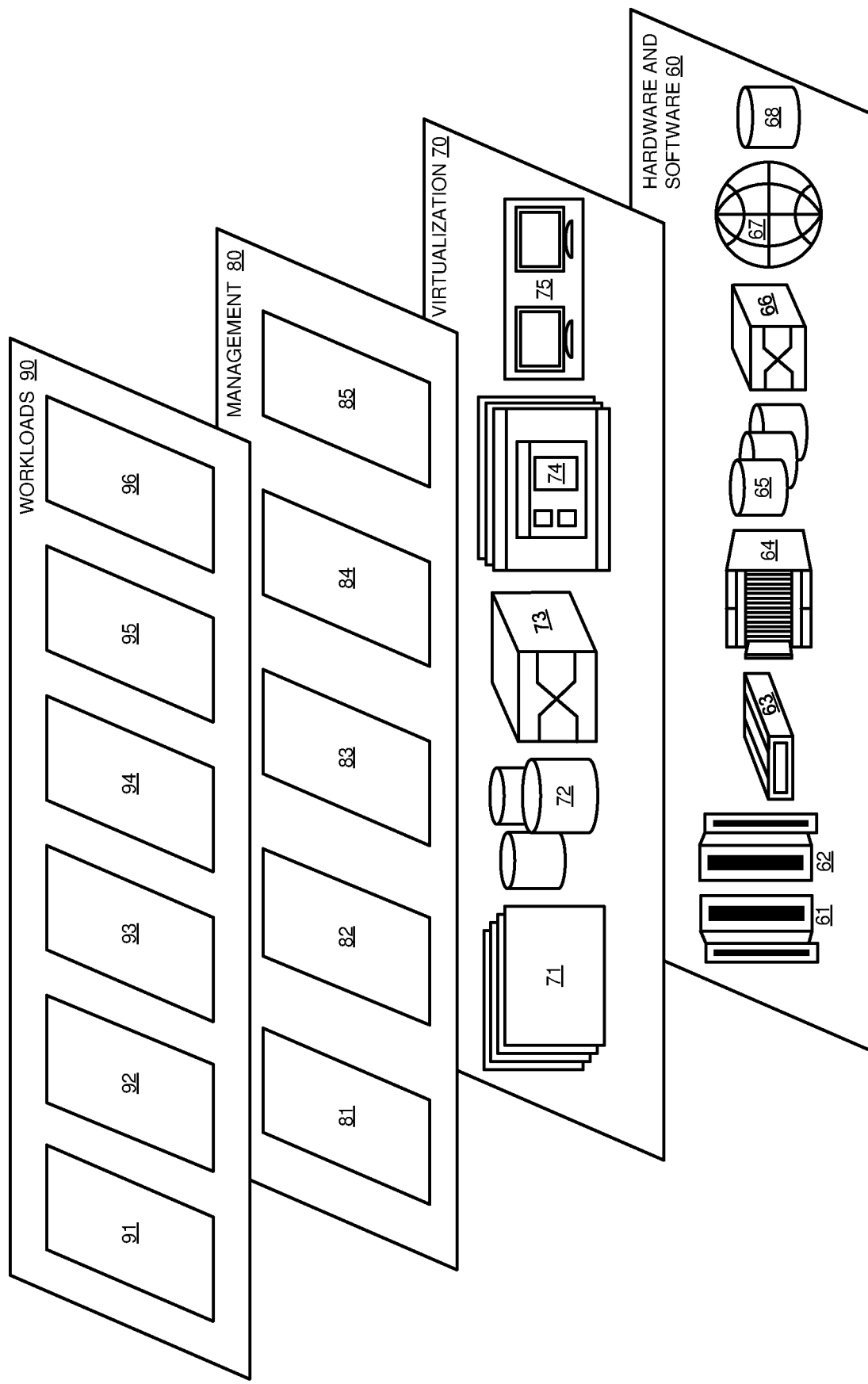
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for geometric shape based event component personalization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   generating, using a first trained residual neural network, an event analysis from a set of event description encodings, an event description encoding in the set of event description encodings comprising a numerical representation of a natural language description of an event, the event analysis comprising a first set of coordinates in an event space;
   generating, using a second trained residual neural network, the event analysis and a user description encoding, a personalization analysis, the user description encoding comprising a numerical representation of a user interaction with the event, the personalization analysis comprising a component of a second set of coordinates in the event space; and
   activating, upon a determination that a product of the event analysis and the personalization analysis corresponds to a first virtual component, a first event component using a first user device, the first event component comprising the first virtual component of the event.

2. The computer-implemented method of claim 1, further comprising:
   generating, using a trained natural language processing model, the event description encoding.

3. The computer-implemented method of claim 1, wherein the first set of coordinates in the event space comprises a first point on a geometric shape.

4. The computer-implemented method of claim 3, wherein the combination of the event analysis and the personalization analysis comprises a point on the geometric shape closest to a product of the first set of coordinates and the component of the second set of coordinates.

5. The computer-implemented method of claim 1, wherein the event space is two-dimensional.

6. The computer-implemented method of claim 5, wherein a first axis in the event space represents a degree to which the event takes place physically and a second axis in the event space represents a degree to which the event takes place virtually, the first axis perpendicular to the second axis.

7. The computer-implemented method of claim 6, wherein the first set of coordinates in the event space comprises a first point on a unit circle.

8. The computer-implemented method of claim 1, wherein the event space is three-dimensional.

9. The computer-implemented method of claim 8, wherein a first axis in the event space represents a degree to which the event takes place physically, wherein a second axis in the event space represents a degree to which the event takes place virtually, wherein a third axis in the event space represents a degree of interaction associated with a user of the event, wherein the first axis is perpendicular to the second axis and wherein the third axis is perpendicular to the first axis and the second axis.

10. The computer-implemented method of claim 8, wherein the first set of coordinates in the event space comprises a first point on a unit sphere.

11. A computer program product for event component personalization, the computer program product comprising:
one or more computer readable storage media, and program instructions collectively stored on the one or more computer readable storage media, the stored program instructions comprising:
program instructions to generate, using a first trained residual neural network, an event analysis from a set of event description encodings, an event description encoding in the set of event description encodings comprising a numerical representation of a natural language description of an event, the event analysis comprising a first set of coordinates in an event space;
program instructions to generate, using a second trained residual neural network, the event analysis and a user description encoding, a personalization analysis, the user description encoding comprising a numerical representation of a user interaction with the event, the personalization analysis comprising a component of a second set of coordinates in the event space; and
program instructions to activate, upon a determination that a product of the event analysis and the personalization analysis corresponds to a first virtual component, a first event component using a first user device, the first event component comprising the first virtual component of the event.

12. The computer program product of claim 11, the stored program instructions further comprising:
program instructions to generate, using a trained natural language processing model, the event description encoding.

13. The computer program product of claim 11, wherein the first set of coordinates in the event space comprises a first point on a geometric shape.

14. The computer program product of claim 13, wherein the combination of the event analysis and the personalization analysis comprises a point on the geometric shape closest to a product of the first set of coordinates and the component of the second set of coordinates.

15. The computer program product of claim 11, wherein the event space is two-dimensional.

16. The computer program product of claim 15, wherein a first axis in the event space represents a degree to which the event takes place physically and a second axis in the event space represents a degree to which the event takes place virtually, the first axis perpendicular to the second axis.

17. The computer program product of claim 11, wherein the stored program instructions are stored in the at least one of the one or more storage media of a local data processing system, and wherein the stored program instructions are transferred over a network from a remote data processing system.

18. The computer program product of claim 11, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 11, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate, using a first trained residual neural network, an event analysis from a set of event description encodings, an event description encoding in the set of event description encodings comprising a numerical representation of a natural language description of an event, the event analysis comprising a first set of coordinates in an event space;
program instructions to generate, using a second trained residual neural network, the event analysis and a user description encoding, a personalization analysis, the user description encoding comprising a numerical representation of a user interaction with the event, the personalization analysis comprising a component of a second set of coordinates in the event space; and
program instructions to activate, upon a determination that a product of the event analysis and the personalization analysis corresponds to a first virtual component, a first event component using a first user device, the first event component comprising the first virtual component of the event.

21. The computer system of claim 20, the stored program instructions further comprising:
program instructions to generate, using a trained natural language processing model, the event description encoding.

22. The computer system of claim 20, wherein the first set of coordinates in the event space comprises a first point on a geometric shape.

23. The computer system of claim 22, wherein the combination of the event analysis and the personalization analysis comprises a point on the geometric shape closest to a product of the first set of coordinates and the component of the second set of coordinates.

24. A data processing system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate, using a first trained residual neural network, an event analysis from a set of event description encodings, an event description encoding in the set of event description encodings comprising a numerical representation of a natural language description of an event, the event analysis comprising a first set of coordinates in an event space;
program instructions to generate, using a second trained residual neural network, the event analysis and a user description encoding, a personalization analysis, the user description encoding comprising a numerical representation of a user interaction with the event, the personalization analysis comprising a component of a second set of coordinates in the event space; and program instructions to activate, upon a determination that a product of the event analysis and the personalization analysis corresponds to a first virtual component, a first event component using a first user device, the first event component comprising the first virtual component of the event.

25. A natural language processing system comprising one or more processors, one or more computer-readable memories, and one or more computer-readable storage devices, and program instructions stored on at least one of the one or more storage devices for execution by at least one of the one or more processors via at least one of the one or more memories, the stored program instructions executable by the one or more processors to cause the one or more processors to perform operations comprising:

generating, using a trained natural language processing model loaded into the one or more of the computer-readable memories and executable by the one or more processors, a set of event description encodings, an event description encoding in the set of event description encodings comprising a numerical representation of a natural language description of an event;

generating, using a first trained residual neural network, an event analysis from the set of event description encodings, the event analysis comprising a first set of coordinates in an event space;

generating, using a second trained residual neural network, the event analysis and a user description encoding, a personalization analysis, the user description encoding comprising a numerical representation of a user interaction with the event, the personalization analysis comprising a component of a second set of coordinates in the event space; and activating, upon a determination that a product of the event analysis and the personalization analysis corresponds to a first virtual component, a first event component using a first user device, the first event component comprising the first virtual component of the event.

\* \* \* \* \*